United States Patent
Zhang et al.

(10) Patent No.: US 12,450,437 B2
(45) Date of Patent: Oct. 21, 2025

(54) METHOD AND APPARATUS FOR NAMED ENTITY RECOGNITION, AND NON-TRANSITORY COMPUTER-READABLE RECORDING MEDIUM

(71) Applicants: Yongwei Zhang, Beijing (CN); Bin Dong, Beijing (CN); Shanshan Jiang, Beijing (CN); Lei Ding, Beijing (CN); Jiashi Zhang, Beijing (CN)

(72) Inventors: Yongwei Zhang, Beijing (CN); Bin Dong, Beijing (CN); Shanshan Jiang, Beijing (CN); Lei Ding, Beijing (CN); Jiashi Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 268 days.

(21) Appl. No.: 18/326,292

(22) Filed: May 31, 2023

(65) Prior Publication Data
US 2023/0394240 A1  Dec. 7, 2023

(30) Foreign Application Priority Data
Jun. 2, 2022  (CN) ................. 202210625365.8

(51) Int. Cl.
*G06F 40/295* (2020.01)
*G06F 40/40* (2020.01)

(52) U.S. Cl.
CPC ............ *G06F 40/295* (2020.01); *G06F 40/40* (2020.01)

(58) Field of Classification Search
CPC .................................................. G06F 40/295
See application file for complete search history.

(56) References Cited

U.S. PATENT DOCUMENTS

| 2022/0164536 | A1* | 5/2022 | Tong | G06N 3/045 |
| 2023/0316001 | A1* | 10/2023 | Araki | G06F 40/35 |
| 2024/0242032 | A1* | 7/2024 | Bay | G06F 18/214 |

OTHER PUBLICATIONS

Zhao, Shuai, et al. "AP-BERT: enhanced pre-trained model through average pooling." Applied Intelligence 52.14 (2022): 15929-15937. (Year: 2022).*
Ding, Ning, et al. "Prompt-learning for fine-grained entity typing." arXiv preprint arXiv:2108.10604 (2021). (Year: 2021).*
(Continued)

*Primary Examiner* — Douglas Godbold
(74) *Attorney, Agent, or Firm* — IPUSA, PLLC

(57) ABSTRACT

A method and an apparatus for named entity recognition, and a non-transitory computer-readable recording medium are provided. In the method, text elements are traversed according to a text span to obtain candidate entity words. Then, a class to which the candidate entity word belongs is recognized. The recognizing of the class includes generating a prompt template corresponding to the candidate entity word, and concatenating the text to be recognized and the prompt template to obtain a concatenated text; generating vector representations of the text elements in the concatenated text; generating the vector representation of the candidate entity word according to the vector representations of the text elements of each candidate entity word in the concatenated text, and the vector representation of the text element of the mask word; and classifying the vector representation of the candidate entity word to obtain the class of the candidate entity word.

15 Claims, 2 Drawing Sheets

(56) References Cited

OTHER PUBLICATIONS

Cui, Leyang, et al. "Template-based named entity recognition using BART." arXiv preprint arXiv:2106.01760 (2021). (Year: 2021).*

Lester, Brian, Rami Al-Rfou, and Noah Constant. "The power of scale for parameter-efficient prompt tuning." arXiv preprint arXiv:2104.08691 (2021). (Year: 2021).*

Ding, Ning, et al. "Openprompt: An open-source framework for prompt-learning." arXiv preprint arXiv:2111.01998 (2021). (Year: 2021).*

* cited by examiner

METHOD AND APPARATUS FOR NAMED ENTITY RECOGNITION, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202210625365.8 filed on Jun. 2, 2022, the entire contents of which are incorporated herein by reference.

BACKGROUND OF THE INVENTION

1. Field of the Invention

The present disclosure relates to the field of machine learning and natural language processing (NLP), and specifically, a method and an apparatus for named entity recognition, and a non-transitory computer-readable recording medium.

2. Description of the Related Art

In the field of artificial intelligence, information extraction technology is an indispensable and important technology. At present, information extraction technology mainly includes three types of algorithms. The first type of algorithm is an extraction algorithm based on knowledge graphs. The extraction algorithm needs support of data and rules of knowledge graphs. Construction of a knowledge graph requires a lot of human resources, but the amount of data finally obtained is insufficient. The second type of algorithm is an extraction algorithm based on traditional statistical machine learning algorithms. This algorithm can use manually labeled training data and apply different learning models to deal with different scenarios. This algorithm has the disadvantages of high labor costs and poor generalization, thus there is a bottleneck in wide application. The third type of algorithm is an algorithm that uses a neural network model that have become popular in recent years. Compared with traditional machine learning algorithms, neural network-based models using large-scale training data sets have shown excellent performance in natural language processing tasks.

Named entity recognition (NER) is a common task in natural language processing. Named entities are used as basic units of semantic representation in many applications and are used in a wide range of applications, thus the named entity recognition technology is very important. The named entities usually refer to entities that have special meaning or are very referential in a text, and usually include names of people, names of places, names of institutions, nouns for time, proper nouns, and the like. Named entity recognition is very important, because the named entities are used as basic units of semantic representation in many tasks. Thus, named entity recognition methods with high precision have great significance in the development of systems with high-performance such as translation, dialogue, public opinion monitoring, topic tracking, and semantic understanding.

Sequence labeling is a common problem in natural language. The solutions to common sequence labeling problems include sequence labeling models such as a hidden Markov model (HMM), a maximum entropy model, a conditional random field (CRF) model, and the like. At present, with the development of deep learning, a recurrent neural network (RNN) has been applied to the sequence labeling problem, which simplifies the solution of the sequence labeling problem. Most of the NLP problems including named entity recognition may be transformed into sequence labeling problems.

In the conventional sequence labeling model, each position in the sequence is marked as a label, and a loss function during model optimization by backpropagation is based on each position rather than the entire entity word, and cannot solve the problem of entity nesting. In a span-based named entity recognition method, all possible spans are enumerated for classification, and the loss function during model optimization is based on the entire entity word, so it is more suitable for a normal thinking mode and can solve the problem of entity nesting.

SUMMARY OF THE INVENTION

According to an aspect of the present disclosure, a method for named entity recognition is provided. The method includes traversing text elements in a text to be recognized according to a text span to obtain a plurality of candidate entity words; and for each candidate entity word, recognizing a class to which the candidate entity word belongs, wherein the recognizing of the class includes generating a prompt template corresponding to the candidate entity word, and concatenating the text to be recognized and the prompt template to obtain a concatenated text, the prompt template being used to learn the class to which the candidate entity word belongs by prompt learning, and the prompt template including the candidate entity word, and an entity class replaced with a mask word; generating vector representations of the text elements in the concatenated text; generating the vector representation of the candidate entity word according to the vector representations of the text elements of each candidate entity word in the concatenated text, and the vector representation of the text element of the mask word; and classifying the vector representation of the candidate entity word to obtain the class to which the candidate entity word belongs.

According to another aspect of the present disclosure, an apparatus for named entity recognition is provided. The apparatus includes a memory storing computer-executable instructions; and one or more processors. The one or more processors are configured to execute the computer-executable instructions such that the one or more processors are configured to traverse text elements in a text to be recognized according to a text span to obtain a plurality of candidate entity words; and for each candidate entity word, recognize a class to which the candidate entity word belongs, wherein the recognizing of the class includes generating a prompt template corresponding to the candidate entity word, and concatenating the text to be recognized and the prompt template to obtain a concatenated text, the prompt template being used to learn the class to which the candidate entity word belongs by prompt learning, and the prompt template including the candidate entity word, and an entity class replaced with a mask word; generating vector representations of the text elements in the concatenated text; generating the vector representation of the candidate entity word according to the vector representations of the text elements of each candidate entity word in the concatenated text, and the vector representation of the text element of the mask word; and classifying the vector representation of the candidate entity word to obtain the class to which the candidate entity word belongs.

According to another aspect of the present disclosure, a non-transitory computer-readable recording medium having computer-executable instructions for execution by one or more processors is provided. The computer-executable instructions, when executed, cause the one or more processors to carry out the method for named entity recognition. The method includes traversing text elements in a text to be recognized according to a text span to obtain a plurality of candidate entity words; and for each candidate entity word, recognizing a class to which the candidate entity word belongs, wherein the recognizing of the class includes generating a prompt template corresponding to the candidate entity word, and concatenating the text to be recognized and the prompt template to obtain a concatenated text, the prompt template being used to learn the class to which the candidate entity word belongs by prompt learning, and the prompt template including the candidate entity word, and an entity class replaced with a mask word; generating vector representations of the text elements in the concatenated text; generating the vector representation of the candidate entity word according to the vector representations of the text elements of each candidate entity word in the concatenated text, and the vector representation of the text element of the mask word; and classifying the vector representation of the candidate entity word to obtain the class to which the candidate entity word belongs.

BRIEF DESCRIPTION OF THE DRAWINGS

The above and other objects, features and advantages of the present disclosure will be further clarified the following detailed description of embodiments of the present disclosure in combination with the drawings. Note that the accompanying drawings in the following description are only some embodiments of the present disclosure, and for those skilled in the art, other drawings may also be obtained according to these drawings without paying creative labor.

DESCRIPTION OF THE EMBODIMENTS

In the following, specific embodiments of the present disclosure will be described in detail with reference to the accompanying drawings, so as to facilitate the understanding of technical problems to be solved by the present disclosure, technical solutions of the present disclosure, and advantages of the present disclosure. The present disclosure is not limited to the specifically described embodiments, and various modifications, combinations and replacements may be made without departing from the scope of the present disclosure. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present disclosure. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in sequential order, however the order in which the steps are performed is not limited to a sequential order. Further, the described steps may be performed in parallel or independently.

Most of the neural network models in the conventional technology are based on a pre-trained model, so the pre-trained model has a great impact on downstream tasks. Thus, the model is instructed to perform specific tasks by adding prompt information, so that the downstream tasks can better adapt to the pre-trained model, thereby achieving better performance. In addition, the problem of low performance of the model on small sample data sets can be optimized by adding prompt learning.

The embodiment of the present disclosure provides a named entity recognition method based on span and prompt learning, which can improve the performance of named entity recognition and reduce the requirement for sample data sets. In the method, named entities are recognized using a neural network model. The neural network model may specifically include a pre-trained model and an output layer based on a softmax function, and the output layer may also be called a softmax layer.

In view of the problem of the conventional technology, an object of the embodiments of the present disclosure is to provide a method and an apparatus for named entity recognition, and a non-transitory computer-readable recording medium, which can improve the performance of named entity recognition and reduce the requirements for sample data sets.

Figure 1:
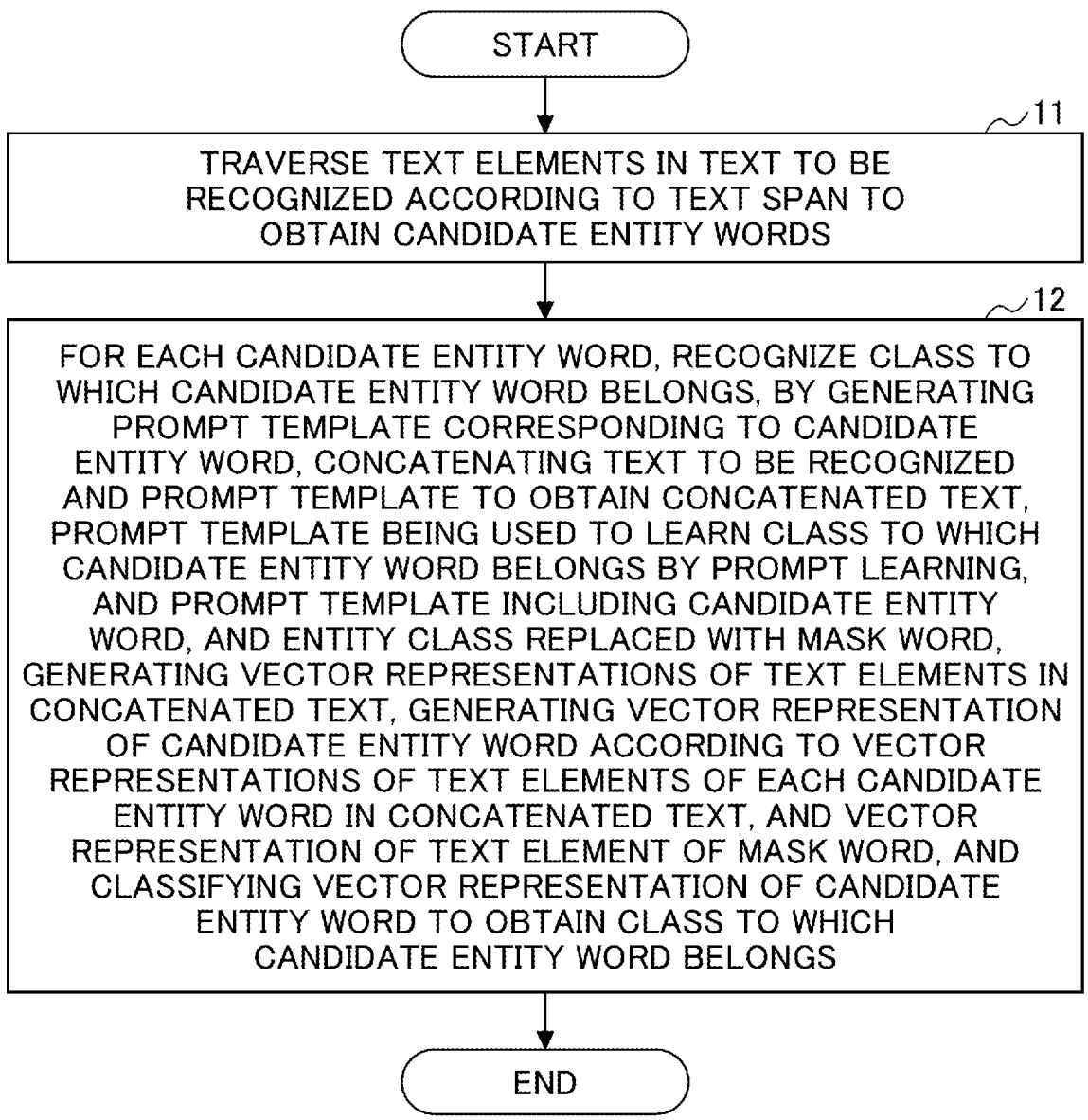
FIG. 1 is a flowchart illustrating an example of a named entity recognition method according to an embodiment of the present disclosure.

In an embodiment of the present disclosure, a named entity recognition method is provided. FIG. 1 is a flowchart illustrating an example of the named entity recognition method according to the embodiment of the present disclosure. As shown in FIG. 1, the named entity recognition method includes steps 11 and 12.

In step 11, text elements in a text to be recognized are traversed according to a text span to obtain a plurality of candidate entity words.

Here, as an example, the text to be recognized may be entered by a user, such as by voice, handwriting or other means, or may be automatically selected. Then, the text elements in the text to be recognized are determined. The types of text elements include words and phrases. In particular, in a case where the text elements are words, word segmentation is performed on the text to be recognized to obtain the text elements, such as word fragments.

In the embodiment of the present disclosure, a maximum length threshold l of the entity word may be set, and the size of the maximum length threshold l may be set according to experience. For example, the size of the maximum length threshold l may be set according to the length of the longest entity word in the field to which the text to be recognized belongs, or may be set according to the longest entity word in the data set, and may be adaptively adjusted according to different data sets during model training. In addition, the maximum length threshold l may generally be less than or equal to the number n of text elements of the text to be recognized, that is, $l \leq n$. Then, under the different text spans, the named entities that may exist in the text to be recognized may be enumerated through the traversal operation, which is applicable to a case where there are multiple nested named entities. There are many specific traversal methods. For example, for the text span i, the text to be recognized may be traversed respectively to obtain candidate entity words composed of consecutive i text elements in the text to be recognized. Here, the value range of i is from 1 to l. As another example, for a text element sequence ([CLS], $x_1$, $x_2$, ..., $x_n$, [SEP]) of the text to be recognized, each text element serving as a start point is combined with the text elements after the current element whose number does not exceed l-1 to obtain the different text spans. Taking the text element $x_i$ as an example, candidate entity words such as $x_i$, $x_i x_{i+1}$, $x_i x_{i+1} x_{i+2}$, ..., $x_i \ldots x_{i+t}$, ... may be obtained. Here $x_i$ represents the i-th text element in the text to be recognized, [CLS] represents a start identifier of the text to be recognized, and [SEP] represents an end identifier of the text to be recognized.

In this way, after the traversal operation in step 11, a plurality of candidate entity words can be obtained. The named entity recognition is performed on each candidate entity word, and the specific recognition method will be described in detail later.

In step 12, for each candidate entity word, a class to which the candidate entity word belongs is recognized by following steps (A) to (D).

In step (A), a prompt template corresponding to the candidate entity word is generated, and the text to be recognized and the prompt template are concatenated to obtain a concatenated text. Here, the prompt template is used to learn the class to which the candidate entity word belongs by prompt learning, and the prompt template includes the candidate entity word, and an entity class replaced with a mask word.

In the embodiment of the present disclosure, prompt learning is combined with span-based named entity recognition. Specifically, for each candidate entity word, the prompt template containing the candidate entity word and an entity class to which the candidate entity word belongs is generated, and the entity class to which the candidate entity word belongs is cover by (replaced with) the mask word. The mask word may be selected according to a specific named entity recognition model, and for example, the mask word may be expressed as [MASK]. It can be seen that since the entity class in the prompt template is ultimately represented by the mask word, it is not necessary to predetermine the class to which the candidate entity word belongs when generating the prompt template. Assuming that the text to be recognized is an English text, the candidate entity word is $x_i$ ... $x_{i+t}$, and the mask word is [MASK]. The prompt templates may have the following forms. In specific applications, one of the prompt templates may be chosen according to the recognition accuracy of the different prompt templates.

$x_i$ ... $x_{i+t}$ is a [MASK]
$x_i$ ... $x_{i+t}$ is a [MASK] entity
The type of $x_i$ ... $x_{i+t}$ is [MASK]
The entity type of $x_i$ ... $x_{i+t}$ is [MASK]

In an example, assuming that the text to be recognized is $x_1$, $x_2$, ..., $x_n$, ($x_i$ ... $x_{i+t}$) is the text span, and the entity class to which the candidate entity word belongs is "A" ("A" is one of a set of named entity classes, and "None" means that the candidate entity word is not a named entity), the entity class A is mapped to a meaningful word [TYPE], and the prompt template "$x_i$ ... $x_i$+c is a [TYPE] entity" is defined based on the text span and the entity class mapping word. Then, the entity class word in the prompt template "$x_i$ ... $x_{i+t}$ is a [TYPE] entity" is replaced with the [MASK] mark of the pre-trained model, and the prompt template becomes "$x_i$ ... $x_{i+t}$ is a [MASK] entity". Thus, the generated concatenated text (including the start identifier and the end identifier) may be represented by a sequence of text elements as follows.

([CLS], $x_1$, $x_2$, ..., $x_n$, $x_i$, ..., $x_{i+t}$, is, a, [MASK], entity, [SEP])

English is taken as an example above for illustration. For a Chinese text, a Japanese text, or a text in another language, the prompt template and the concatenated text may also be generated in a similar manner.

In step (B), vector representations of the text elements in the concatenated text are generated.

Here, a vector conversion process is performed on each text element in the concatenated text, that is, an embedding process is performed on the text element, and the text element is mapped to a vector space to obtain the vector representation of the text element. That is, the text element is expressed in the form of a vector for subsequent processing.

Specifically, the vector representations of the text elements in the concatenated text may be generated through the pre-trained model. The concatenated text is input to the pre-trained model, and the pre-trained model outputs vector representations of the text elements in the concatenated text. The pre-trained model includes but is not limited to one of models such as a BERT model, an Albert model, a Roberta model, an XLnet model and the like.

Continuing with the above example, after inputting the concatenated text into the pre-trained model, the vector representations of the text elements in the concatenated text are obtained as follows.

$(e_{CLS}, e_1, e_2, \ldots e_i, \ldots, e_{i+t}, \ldots e_n, e_i', e_{i+1}', \ldots, e_{i+t}', e_{is}, e_a, e_{MASK}, e_{entity}, e_{SEP})$ Here, $e_{CLS}$ is the vector representation of the start identifier, which has no obvious semantics. After the self-attention mechanism, the semantic information of all text elements is "fairly" fused, so as to better represent the semantics of the entire sentence. Here, $e_{SEP}$ is the vector representation of the end identifier, $e_i$ is the vector representation of the text element $x_i$ in the text to be recognized, $e_i'$ is the vector representation of the text element $x_i$ in the prompt template, $e_{is}$ is the vector representation of the text element "is" in the text to be recognized, $e_a$ is the vector representation of the text element "a" in the text to be recognized, $e_{MASK}$ is the vector representation of the mask word in the prompt template, and $e_{entity}$ is the vector representation of the text element entity in the prompt template. Here, $(e_i, \ldots, e_{i+t})$ are the vector representations of the text elements of the candidate entity word in the text to be recognized, and $(e_i', \ldots, e_{i+t}')$ are the vector representations of the text elements of the candidate entity word in the prompt template.

In step (C), the vector representation of the candidate entity word is generated according to the vector representations of the text elements of each candidate entity word in the concatenated text, and the vector representation of the text element of the mask word.

In the embodiment of the present disclosure, the concatenated text includes the text to be recognized and the prompt template, and the text to be recognized and the prompt template include one of the candidate entity words, respectively. That is to say, the concatenated text includes two of the candidate entity words. In the embodiment of the present disclosure, a first integration process is performed on the vector representations of the text elements of each of the candidate entity words in the concatenated text to obtain a first span representation and a second span representation of each candidate entity word. That is, the first integration process is performed on the vector representations of the text elements of the candidate entity word in the text to be recognized to obtain the first span representation of the candidate entity word, and the first integration process is performed on the vector representations of the text elements of the candidate entity word in the prompt template to obtain the second span representation of the candidate entity word. Here, the first integration process may include any one of a max pooling process, an average pooling process, concatenating of the vector representations of the first text element and the last text element in the candidate entity word, and the like.

For example, through the max pooling process, the first span representation $e_{span}'$ and the second span representation $e_{span}''$ are obtained.

$$e_{span}'=\mathrm{maxPooling}(e_i, \ldots, e_{i+t})$$

$$e_{span}''=\mathrm{maxPooling}(e_i', \ldots, e_{i+t}')$$

After obtaining the first span representation and the second span representation of the candidate entity word, there are multiple ways in the embodiment of the present disclosure to generate the vector representation of the candidate entity word, which will be described below.

As an implementation of generating the vector representation of the candidate entity word, in the embodiment of the present disclosure, the vector representation of the candidate entity word may be generated according to the first span representation, the second span representation, and the vector representation of the text element of the mask word.

For example, a second integration process is performed on the first span representation and the second span representation to obtain a third span representation. Then, the third span representation and the vector representation of the text element of the mask word are concatenated to obtain the vector representation of the candidate entity word. The second integration process may include any one of a max pooling process and an average pooling process.

For another example, the second integration process is performed on the first span representation and the second span representation to obtain a third span representation. Then, a vector representation corresponding to a width value of a text span of the candidate entity word is obtained, and the third span representation and the vector representation corresponding to the width value of the text span of the candidate entity word are concatenated to obtain a fourth span representation. Then, the fourth span representation and the vector representation of the text element of the mask word are concatenated to obtain the vector representation of the candidate entity word.

Here, the width value of the text span of the candidate entity word refers to the number of text elements included in the candidate entity word. Regarding the vector representation corresponding to the width value of the text span of the candidate entity word, a representation matrix of the width values may be obtained through backpropagation, and the representation matrix of the width values include the vector representations corresponding to the width values of the text spans (such as the width values 1, 2, 3, . . . , l). The vector representation corresponding to the width value of the current text span may be obtained by searching the matrix.

Since the vector representation of the start identifier generated by the pre-trained model usually includes the semantic information of each text element in the concatenated text, in the embodiment of the present disclosure, the vector representation of the start identifier may further be combined to generate the Vector representation of candidate entity word.

Specifically, as another implementation of generating the vector representation of the candidate entity word, in the embodiment of the present disclosure, the vector representation of the candidate entity word may be generated according to the first span representation, the second span representation, the vector representation of the text element of the mask word, and the vector representation of the start identifier.

For example, the second integration process is performed on the first span representation and the second span representation to obtain a third span representation. Then, the third span representation, the vector representation of the start identifier, and the vector representation of the text element of the mask word are concatenated to obtain the vector representation of the candidate entity word.

For another example, the second integration process is performed on the first span representation and the second span representation to obtain a third span representation. Then, a vector representation $e_w$ corresponding to a width value of a text span of the candidate entity word is obtained, and the third span representation and the vector representation $e_w$ corresponding to the width value of the text span of the candidate entity word are concatenated to obtain a fourth span representation. Then, the fourth span representation, the vector representation $e_{CLS}$ of the start identifier, and the vector representation $e_{MASK}$ of the text element of the mask word are concatenated to obtain the vector representation e of the candidate entity word. The above processing may be implemented by a formula expressed as follows, where the second integration process uses an average pooling process, and $\oplus$ represents vector concatenation.

$$e=\mathrm{AvgPooling}(e_{span}', e_{span}'') \oplus e_w \oplus E_{CLS} \oplus e_{MASK}$$

In addition, note that the method for generating the vector representation of the candidate entity word may be selected according to the named entity recognition performance under different generating methods.

In step (D), the vector representation of the candidate entity word is classified to obtain the class to which the candidate entity word belongs.

Here, a classification process is performed on the vector representation of candidate entity word to map the vector representation to probabilities respectively corresponding to a plurality of candidate classes, and the class to which the candidate entity word belongs is determined according to the plurality of probabilities. Here, the candidate classes include a non-entity class and a plurality of named entity classes. Specifically, the vector representation of the candidate entity word may be input into a softmax function to obtain at least one probability that the candidate entity word is mapped to different candidate classes, which is output by the softmax function. Then, the candidate class with the highest probability may be selected as the class to which the candidate entity word belongs. The above process can be expressed as the following softmax function.

$$\widetilde{y_{span}}=\mathrm{softmax}(W^*e+b)$$

$\widetilde{y_{span}}$ an represents the probabilities that the candidate entity word are mapped to different candidate classes, and W and b represent the trainable parameters of the neural network model.

In addition, note that in the embodiment of the present disclosure, the non-entity class is also regarded as the candidate class and treated equally with the named entity class, that is, the candidate classes include the non-entity class and the plurality of named entity classes. The plurality of named entity classes may be names of people, names of places, names of institutions, and the like. Here, "a plurality of" in the embodiments of the present disclosure generally refers to "at least two".

The above method in the embodiment of the present disclosure may be applied in a training process and a prediction process of the neural network model. For example, in a case where the method is applied to the training process, a neural network model for named entity recognition can be obtained by training. In a case where the method is applied to the prediction process, the neural network model obtained by training can be used to recognize the class to which the candidate entity word belongs. Furthermore, after obtaining the class to which the candidate entity word belongs, the candidate entity words belonging to the named entity class in the text to be recognized may also be applied to application scenarios of natural language processing, which include but not limited to the application scenarios of abstract determination, object recommendation, text classification, and question answering.

It can be seen from the above that in the above-mentioned named entity recognition method of the embodiment of the present disclosure, a prompt template construction method based on a text span is proposed. For example, the prompt template "[SPAN] is a [MASK] entity" is used. Here, [SPAN] represents the text span of the candidate entity word, and [MASK] is the entity type that has been replaced with a mask. By the prompt template, it is possible to help the pre-trained model recall the knowledge learned in the pre-training stage, thereby making downstream tasks more suitable for the pre-trained model. Furthermore, in the embodiment of the present disclosure, a representation method that combines span representation with prompt information is proposed. In the method, an original span and a span in the prompt template are combined through methods such as average pooling, max pooling, or the like, and the representation of the mask word [MASK] is concatenated with the span representation. Thus, the final representation of the candidate entity word not only has span information, but also has prompt information to be provided to the model, which can effectively improve the performance of named entity recognition, and can also reduce the requirements for sample data sets. For small sample datasets, the model has a significant effect. In addition, the construction method of the prompt template in the embodiment of the present disclosure is simple and effective.

Compared with the conventional technology, in the method and the apparatus for named entity recognition, and the non-transitory computer-readable recording medium according to the embodiments of the present disclosure, the span information and the prompt information of the prompt template are combined in the final representation of the candidate entity words, thereby effectively improving the performance of named entity recognition and reducing the requirements for sample data sets. For small sample data sets, the model has a significant effect. In addition, the construction method of the prompt template in the embodiment of the present disclosure is simple and effective.

Figure 2:
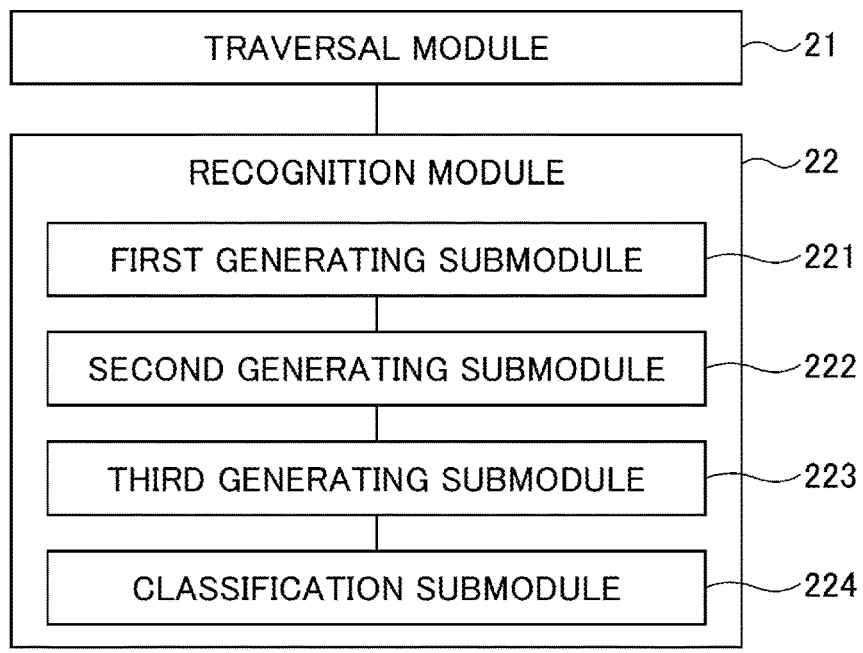
FIG. 2 is a block diagram illustrating an example of a configuration of a named entity recognition apparatus according to another embodiment of the present disclosure.

In another embodiment of the present disclosure, a named entity recognition apparatus is further provided. FIG. 2 is a block diagram illustrating an example of a configuration of the named entity recognition apparatus according to another embodiment of the present disclosure. As shown in FIG. 2, the named entity recognition apparatus includes a traversal module 21 and a recognition module 22.

The traversal module 21 traverses text elements in a text to be recognized according to a text span to obtain a plurality of candidate entity words.

For each candidate entity word, the recognition module 22 recognizes a class to which the candidate entity word belongs by the following submodules.

A first generating submodule 221 generates a prompt template corresponding to the candidate entity word, and concatenates the text to be recognized and the prompt template to obtain a concatenated text. The prompt template is used to learn the class to which the candidate entity word belongs by prompt learning, and the prompt template includes the candidate entity word, and an entity class replaced with a mask word.

A second generating submodule 222 generates vector representations of the text elements in the concatenated text.

A third generating submodule 223 generates the vector representation of the candidate entity word according to the vector representations of the text elements of each candidate entity word in the concatenated text, and the vector representation of the text element of the mask word.

A classification submodule 224 classifies the vector representation of the candidate entity word to obtain the class to which the candidate entity word belongs.

Through the above modules, the named entity recognition apparatus of the embodiment of the present disclosure can effectively improve the performance of named entity recognition, and can also reduce the requirement on the sample data set.

Preferably, the third generating submodule performs a first integration process on the vector representations of the text elements of the candidate entity word in the text to be recognized to obtain a first span representation of the candidate entity word. Then, the third generating submodule performs the first integration process on the vector representations of the text elements of the candidate entity word in the prompt template to obtain a second span representation of the candidate entity word. Then, the third generating submodule generates the vector representation of the candidate entity word according to the first span representation, the second span representation, and the vector representation of the text element of the mask word.

Preferably, the third generation submodule performs a second integration process on the first span representation and the second span representation to obtain a third span representation. Then, the third generating submodule concatenates the third span representation and the vector representation of the text element of the mask word to obtain the vector representation of the candidate entity word.

Preferably, the third generating submodule performs a second integration process on the first span representation and the second span representation to obtain a third span representation. Then, the third generating submodule obtains a vector representation corresponding to a width value of a text span of the candidate entity word, and concatenates the third span representation and the vector representation corresponding to the width value of the text span of the candidate entity word to obtain a fourth span representation. Then, the third generating submodule concatenates the fourth span representation and the vector representation of the text element of the mask word to obtain the vector representation of the candidate entity word.

Preferably, the concatenated text includes a start identifier. The third generation submodule performs a first integration process on the vector representations of the text elements of the candidate entity word in the text to be recognized to obtain a first span representation of the candidate entity word. Then, the third generating submodule performs the first integration process on the vector representations of the text elements of the candidate entity word in the prompt template to obtain a second span representation of the candidate entity word. Then, the third generating submodule generates the vector representation of the candidate entity word according to the first span representation, the second span representation, the vector representation of the start identifier, and the vector representation of the text element of the mask word.

Preferably, the third generating submodule performs a second integration process on the first span representation and the second span representation to obtain a third span representation. Then, the third generating submodule concatenates the third span representation, the vector representation of the start identifier, and the vector representation of the text element of the mask word to obtain the vector representation of the candidate entity word.

Preferably, the third generating submodule performs a second integration process on the first span representation and the second span representation to obtain a third span representation. Then, the third generating submodule obtains a vector representation corresponding to a width value of a text span of the candidate entity word, and concatenates the third span representation and the vector representation corresponding to the width value of the text span of the candidate entity word to obtain a fourth span representation. Then, the third generating submodule concatenates the fourth span representation, the vector representation of the start identifier, and the vector representation of the text element of the mask word to obtain the vector representation of the candidate entity word.

Preferably, the first integration process includes any one of a max pooling process, an average pooling process, and concatenating of the vector representations of the first text element and the last text element in the candidate entity word. The second integration process includes any one of a max pooling process and an average pooling process.

Preferably, the classification submodule inputs the vector representation of the candidate entity word into a softmax function to obtain at least one probability that the candidate entity word is mapped to different candidate classes, which is output by the softmax function. Then, the classification submodule selects the candidate class with the highest probability serving as the class to which the candidate entity word belongs.

Figure 3:
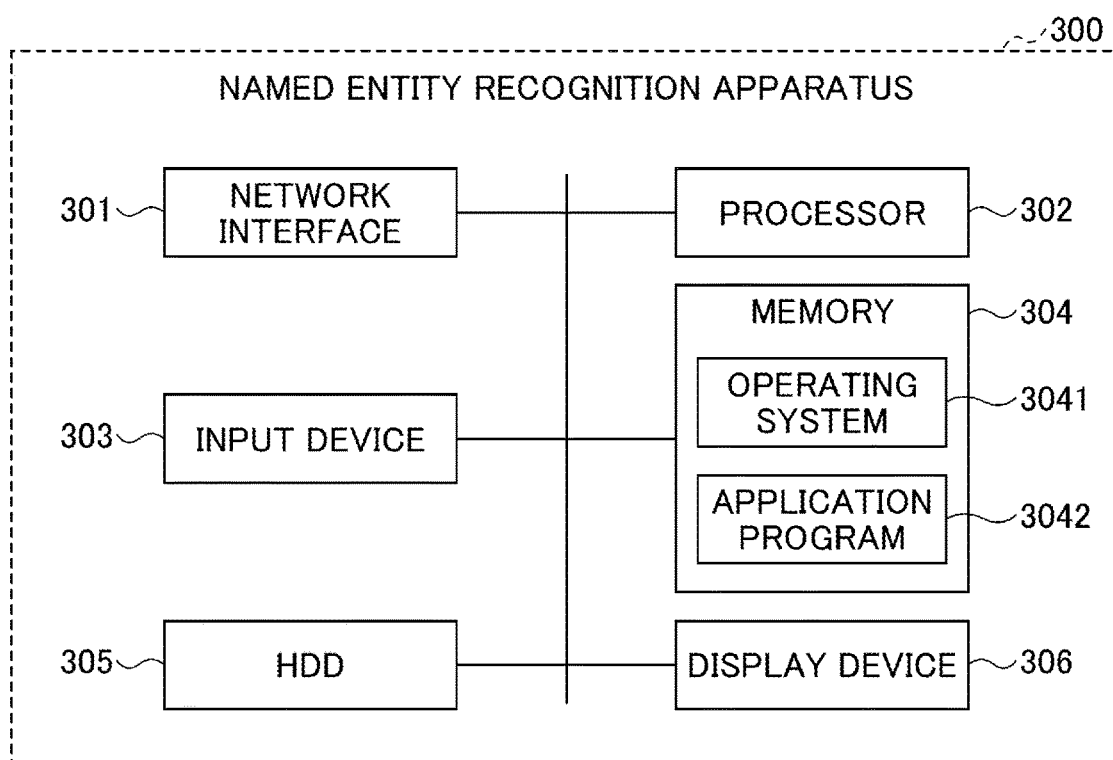
FIG. 3 is a block diagram illustrating another example of the configuration of the named entity recognition apparatus according to the embodiment of the present disclosure.

FIG. 3 is a block diagram illustrating another example of the configuration of the named entity recognition apparatus according to the embodiment of the present disclosure. As shown in FIG. 3, the named entity recognition apparatus 300 includes a processor 302, and a memory 304 storing computer-executable instructions.

When the computer-executable instructions are executed by the processor 302, the processor 302 are configured to perform the following steps.

Text elements in a text to be recognized are traversed according to a text span to obtain a plurality of candidate entity words.

For each candidate entity word, a class to which the candidate entity word belongs is recognized by the following steps.

A prompt template corresponding to the candidate entity word is generated, and the text to be recognized and the prompt template are concatenated to obtain a concatenated text. The prompt template is used to learn the class to which the candidate entity word belongs by prompt learning, and the prompt template includes the candidate entity word, and an entity class replaced with a mask word.

Vector representations of the text elements in the concatenated text are generated.

The vector representation of the candidate entity word is generated according to the vector representations of the text elements of each candidate entity word in the concatenated text, and the vector representation of the text element of the mask word.

The vector representation of the candidate entity word is classified to obtain the class to which the candidate entity word belongs.

Furthermore, as shown in FIG. 3, the named entity recognition apparatus 300 further includes a network interface 301, an input device 303, a hard disk drive (HDD) 305, and a display device 306.

Each of the ports and each of the devices may be connected to each other via a bus architecture. The processor 302, such as one or more central processing units (CPUs), and the memory 304, such as one or more memory units, may be connected via various circuits. Other circuits such as an external device, a regulator, and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 301 may be connected to a network (such as the Internet, a LAN or the like), receive data (such as a panoramic image) from the network, and store the received data in the hard disk drive 305.

The input device 303 may receive various commands such as predetermined threshold and its setting information input by a user, and transmit the commands to the processor 302 to be executed. The input device 303 may include a keyboard, pointing devices (such as a mouse or a track ball), a touch board, a touch panel or the like.

The display device 306 may display a result obtained by the processor 302 executing instructions, such as the recognized entity words and the classes to which the entity words belong.

The memory 304 stores programs and data required for running an operating system, and data such as intermediate results in calculation processes of the processor 302.

Note that the memory 304 of the embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which may be used as an external high-speed buffer. The memory 304 of the apparatus or the method is not limited to the described types of memory, and may include any other suitable memory.

In some embodiments, the memory 304 stores executable modules or data structure, their subsets, or their superset, i.e., an operating system (OS) 3041 and an application program 3042.

The operating system 3041 includes various system programs for implementing various essential tasks and processing tasks based on hardware, such as a frame layer, a core library layer, a drive layer and the like. The application program 3042 includes various application programs for implementing various application tasks, such as a browser and the like. A program for implementing the method according to the embodiments of the present disclosure may be included in the application program 3042.

The method according to the above embodiments of the present disclosure may be applied to the processor 302 or may be implemented by the processor 302. The processor 302 may be an integrated circuit chip capable of processing signals. Each step of the above method may be implemented by instructions in a form of integrated logic circuit of hardware in the processor 302 or a form of software. The processor 302 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of implementing or executing the methods, the steps and the logic blocks of the embodiments of the present disclosure. The general-purpose processor may be a microprocessor, or alternatively, the processor may be any common processor. The steps of the method according to the embodiments of the present disclosure may be implemented by a hardware decoding processor, or combination of hardware modules and software modules in a decoding processor. The software modules may be located in a conventional storage medium such as a random access memory (RAM), a flash memory, a read-only memory (ROM), an erasable programmable read-only memory (EPROM), an electrically erasable programmable read-only memory (EEPROM), a register or the like. The storage medium is located in the memory 304, and the processor 302 reads information in the memory 304 and implements the steps of the above methods in combination with hardware.

Note that the embodiments described herein may be implemented by hardware, software, firmware, intermediate code, microcode or any combination thereof. For hardware implementation, the processor may be implemented in one or more application specific integrated circuits (ASIC), digital signal processors (DSP), digital signal processing devices (DSPD), programmable logic devices (PLD), field programmable gate array signals (FPGA), general-purpose processors, controllers, micro-controllers, micro-processors, or other electronic components or their combinations for implementing functions of the present disclosure.

For software implementation, the embodiments of the present disclosure may be implemented by executing functional modules (such as processes, functions or the like). Software codes may be stored in a memory and executed by a processor. The memory may be implemented inside or outside the processor.

Preferably, when the computer-readable instructions are executed by the processor 302, the processor 302 is configured to perform a first integration process on the vector representations of the text elements of the candidate entity word in the text to be recognized to obtain a first span representation of the candidate entity word; perform the first integration process on the vector representations of the text elements of the candidate entity word in the prompt template to obtain a second span representation of the candidate entity word; and generate the vector representation of the candidate entity word according to the first span representation, the second span representation, and the vector representation of the text element of the mask word.

Preferably, when the computer-readable instructions are executed by the processor 302, the processor 302 is configured to perform a second integration process on the first span representation and the second span representation to obtain a third span representation; and concatenate the third span representation and the vector representation of the text element of the mask word to obtain the vector representation of the candidate entity word.

Preferably, when the computer-readable instructions are executed by the processor 302, the processor 302 is configured to perform a second integration process on the first span representation and the second span representation to obtain a third span representation; obtain a vector representation corresponding to a width value of a text span of the candidate entity word, and concatenate the third span representation and the vector representation corresponding to the width value of the text span of the candidate entity word to obtain a fourth span representation; and concatenate the fourth span representation and the vector representation of the text element of the mask word to obtain the vector representation of the candidate entity word.

Preferably, the concatenated text includes a start identifier. When the computer-readable instructions are executed by the processor 302, the processor 302 is configured to perform a first integration process on the vector representations of the text elements of the candidate entity word in the text to be recognized to obtain a first span representation of the candidate entity word; perform the first integration process on the vector representations of the text elements of the candidate entity word in the prompt template to obtain a second span representation of the candidate entity word; and generate the vector representation of the candidate entity word according to the first span representation, the second span representation, the vector representation of the start identifier, and the vector representation of the text element of the mask word.

Preferably, when the computer-readable instructions are executed by the processor 302, the processor 302 is configured to perform a second integration process on the first span representation and the second span representation to obtain a third span representation; and concatenate the third span representation, the vector representation of the start identifier, and the vector representation of the text element of the mask word to obtain the vector representation of the candidate entity word.

Preferably, when the computer-readable instructions are executed by the processor 302, the processor 302 is configured to perform a second integration process on the first span representation and the second span representation to obtain a third span representation; obtain a vector representation corresponding to a width value of a text span of the candidate entity word, and concatenate the third span representation and the vector representation corresponding to the width value of the text span of the candidate entity word to obtain a fourth span representation; and concatenate the fourth span representation, the vector representation of the start identifier, and the vector representation of the text element of the mask word to obtain the vector representation of the candidate entity word.

Preferably, the first integration process includes any one of a max pooling process, an average pooling process, and concatenating of the vector representations of the first text element and the last text element in the candidate entity word, and the second integration process includes any one of a max pooling process and an average pooling process.

Preferably, when the computer-readable instructions are executed by the processor 302, the processor 302 is configured to input the vector representation of the candidate entity word into a softmax function to obtain at least one probability that the candidate entity word is mapped to different candidate classes, which is output by the softmax function; and select the candidate class with the highest probability serving as the class to which the candidate entity word belongs.

In another embodiment of the present disclosure, a non-transitory computer-readable recording medium having computer-executable instructions for execution by one or more processors is further provided. The execution of the computer-executable instructions cause the one or more processors to carry out a method for named entity recognition. The method includes traversing text elements in a text to be recognized according to a text span to obtain a plurality of candidate entity words; and for each candidate entity word, recognizing a class to which the candidate entity word belongs. The recognizing of the class includes generating a prompt template corresponding to the candidate entity word, and concatenating the text to be recognized and the prompt template to obtain a concatenated text, the prompt template being used to learn the class to which the candidate entity word belongs by prompt learning, and the prompt template including the candidate entity word, and an entity class replaced with a mask word; generating vector representations of the text elements in the concatenated text; generating the vector representation of the candidate entity word according to the vector representations of the text elements of each candidate entity word in the concatenated text, and the vector representation of the text element of the mask word; and classifying the vector representation of the candidate entity word to obtain the class to which the candidate entity word belongs.

As known by a person skilled in the art, the elements and algorithm steps of the embodiments disclosed herein may be implemented by electronic hardware or a combination of computer software and electronic hardware. Whether these functions are performed by hardware or software depends on the specific application and design constraints of the solution. A person skilled in the art may use different methods for implementing the described functions for each particular application, but such implementation should not be considered to be beyond the scope of the present disclosure.

As clearly understood by a person skilled in the art, for the convenience and brevity of the description, the specific working process of the system, the device and the unit described above may refer to the corresponding process in the above method embodiment, and detailed descriptions thereof are omitted here.

In the embodiments of the present disclosure, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, the units may be located in one place, or may be distributed across network units. Some or all of the units may be selected according to actual needs to achieve the objectives of the embodiments of the present disclosure.

In addition, each functional unit the embodiments of the present disclosure may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present disclosure, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present disclosure. The above storage medium includes various media that can store program codes, such as a USB flash drive, a mobile hard disk, a ROM, a RAM, a magnetic disk, or an optical disk.

The present disclosure is not limited to the specifically described embodiments, and various modifications, combinations and replacements may be made without departing from the scope of the present disclosure.

What is claimed is:

1. A method for named entity recognition, the method comprising:
   traversing text elements in a text to be recognized according to an original text span to obtain a plurality of candidate entity words; and
   for each candidate entity word, recognizing a class to which the candidate entity word belongs,
   wherein the recognizing of the class includes
      generating a prompt template corresponding to the candidate entity word, and concatenating the text to be recognized and the prompt template to obtain a concatenated text, the prompt template being used to learn the class to which the candidate entity word belongs by prompt learning, and the prompt template including the candidate entity word, and an entity class replaced with a mask word, according to a span in the prompt template;
      generating vector representations of the text elements in the concatenated text;
      generating the vector representation of the candidate entity word according to the vector representations of the text elements of each candidate entity word in the concatenated text, and the vector representation of the text element of the mask word; and
      classifying the vector representation of the candidate entity word to obtain the class to which the candidate entity word belongs,
   wherein the generating of the vector representation of the candidate entity word includes
      performing a first integration process on the vector representations of the text elements of the candidate entity word in the text to be recognized to obtain a first span representation of the candidate entity word;
      performing the first integration process on the vector representations of the text elements of the candidate entity word in the prompt template to obtain a second span representation of the candidate entity word; and
      generating the vector representation of the candidate entity word according to the first span representation, the second span representation, and the vector representation of the text element of the mask word,
   wherein the generating of the vector representation of the candidate entity word further includes performing a second integration process on the first span representation and the second span representation to obtain a third span representation; and concatenating the third span representation and the vector representation of the text element of the mask word to obtain the vector representation of the candidate entity word, and wherein the original text span and the span in the prompt template are combined in the generating of the vector representation of the candidate entity word to obtain a final representation of the candidate entity word, and the final representation of the candidate entity word is provided to a neural network model.

2. The method for named entity recognition as claimed in claim 1, wherein the generating of the vector representation of the candidate entity word includes obtaining a vector representation corresponding to a width value of a text span of the candidate entity word, and concatenating the third span representation and the vector representation corresponding to the width value of the text span of the candidate entity word to obtain a fourth span representation; and concatenating the fourth span representation and the vector representation of the text element of the mask word to obtain the vector representation of the candidate entity word.

3. The method for named entity recognition as claimed in claim 1, wherein the concatenated text includes a start identifier, and the generating of the vector representation of the candidate entity word includes generating the vector representation of the candidate entity word according to the first span representation, the second span representation, the vector representation of the start identifier, and the vector representation of the text element of the mask word.

4. The method for named entity recognition as claimed in claim 3, wherein the generating of the vector representation of the candidate entity word includes concatenating the third span representation, the vector representation of the start identifier, and the vector representation of the text element of the mask word to obtain the vector representation of the candidate entity word.

5. The method for named entity recognition as claimed in claim 3, wherein the generating of the vector representation of the candidate entity word includes obtaining a vector representation corresponding to a width value of a text span of the candidate entity word, and concatenating the third span representation and the vector representation corresponding to the width value of the text span of the candidate entity word to obtain a fourth span representation; and concatenating the fourth span representation, the vector representation of the start identifier, and the vector representation of the text element of the mask word to obtain the vector representation of the candidate entity word.

6. The method for named entity recognition as claimed in claim 1, wherein the first integration process includes any one of a max pooling process, an average pooling process, and concatenating of the vector representations of the first text element and the last text element in the candidate entity word, and the second integration process includes any one of a max pooling process and an average pooling process.

7. The method for named entity recognition as claimed in claim 1, wherein the classifying of the vector representation of the candidate entity word includes inputting the vector representation of the candidate entity word into a softmax function to obtain at least one probability that the candidate entity word is mapped to different candidate classes, which is output by the softmax function; and selecting the candidate class with the highest probability serving as the class to which the candidate entity word belongs.

8. An apparatus for named entity recognition, the apparatus comprising:

a memory storing computer-executable instructions; and one or more processors configured to execute the computer-executable instructions such that the one or more processors are configured to perform traversing text elements in a text to be recognized according to an original text span to obtain a plurality of candidate entity words; and for each candidate entity word, recognizing a class to which the candidate entity word belongs, wherein the recognizing of the class includes generating a prompt template corresponding to the candidate entity word, and concatenating the text to be recognized and the prompt template to obtain a concatenated text, the prompt template being used to learn the class to which the candidate entity word belongs by prompt learning, and the prompt template including the candidate entity word, and an entity class replaced with a mask word, according to a span in the prompt template;

generating vector representations of the text elements in the concatenated text;

generating the vector representation of the candidate entity word according to the vector representations of the text elements of each candidate entity word in the concatenated text, and the vector representation of the text element of the mask word; and classifying the vector representation of the candidate entity word to obtain the class to which the candidate entity word belongs, wherein the generating of the vector representation of the candidate entity word includes performing a first integration process on the vector representations of the text elements of the candidate entity word in the text to be recognized to obtain a first span representation of the candidate entity word;

performing the first integration process on the vector representations of the text elements of the candidate entity word in the prompt template to obtain a second span representation of the candidate entity word; and generating the vector representation of the candidate entity word according to the first span representation, the second span representation, and the vector representation of the text element of the mask word, wherein the generating of the vector representation of the candidate entity word further includes performing a second integration process on the first span representation and the second span representation to obtain a third span representation; and concatenating the third span representation and the vector representation of the text element of the mask word to obtain the vector representation of the candidate entity word, and wherein the original text span and the span in the prompt template are combined in the generating of the vector representation of the candidate entity word to obtain a final representation of the candidate entity word, and the final representation of the candidate entity word is provided to a neural network model.

9. The apparatus for named entity recognition as claimed in claim 8, wherein the one or more processors are configured to obtain a vector representation corresponding to a width value of a text span of the candidate entity word, and concatenate the third span representation and the vector representation corresponding to the width value of the text span of the candidate entity word to obtain a fourth span representation; and concatenate the fourth span representation and the vector representation of the text element of the mask word to obtain the vector representation of the candidate entity word.

10. The apparatus for named entity recognition as claimed in claim 8, wherein the concatenated text includes a start identifier, and the one or more processors are configured to generate the vector representation of the candidate entity word according to the first span representation, the second span representation, the vector representation of the start identifier, and the vector representation of the text element of the mask word.

11. The apparatus for named entity recognition as claimed in claim 10, wherein the one or more processors are configured to concatenate the third span representation, the vector representation of the start identifier, and the vector representation of the text element of the mask word to obtain the vector representation of the candidate entity word.

12. The apparatus for named entity recognition as claimed in claim 10, wherein the one or more processors are configured to obtain a vector representation corresponding to a width value of a text span of the candidate entity word, and concatenate the third span representation and the vector representation corresponding to the width value of the text span of the candidate entity word to obtain a fourth span representation; and concatenate the fourth span representation, the vector representation of the start identifier, and the vector representation of the text element of the mask word to obtain the vector representation of the candidate entity word.

13. The apparatus for named entity recognition as claimed in claim 8, wherein the first integration process includes any one of a max pooling process, an average pooling process, and concatenating of the vector representations of the first text element and the last text element in the candidate entity word, and the second integration process includes any one of a max pooling process and an average pooling process.

14. The apparatus for named entity recognition as claimed in claim 8, wherein the one or more processors are configured to input the vector representation of the candidate entity word into a softmax function to obtain at least one probability that the candidate entity word is mapped to different candidate classes, which is output by the softmax function; and select the candidate class with the highest probability serving as the class to which the candidate entity word belongs.

15. A non-transitory computer-readable recording medium having computer-executable instructions for execution by one or more processors, wherein, the computer-executable instructions, when executed, cause the one or more processors to carry out a method for named entity recognition, the method comprising:

traversing text elements in a text to be recognized according to an original text span to obtain a plurality of candidate entity words; and for each candidate entity word, recognizing a class to which the candidate entity word belongs, wherein the recognizing of the class includes generating a prompt template corresponding to the candidate entity word, and concatenating the text to be recognized and the prompt template to obtain a concatenated text, the prompt template being used to learn the class to which the candidate entity word belongs by prompt learning, and the prompt template including the candidate entity word, and an entity class replaced with a mask word, according to a span in the prompt template;

generating vector representations of the text elements in the concatenated text;

generating the vector representation of the candidate entity word according to the vector representations of the text elements of each candidate entity word in the concatenated text, and the vector representation of the text element of the mask word; and classifying the vector representation of the candidate entity word to obtain the class to which the candidate entity word belongs, wherein the generating of the vector representation of the candidate entity word includes performing a first integration process on the vector representations of the text elements of the candidate entity word in the text to be recognized to obtain a first span representation of the candidate entity word;

performing the first integration process on the vector representations of the text elements of the candidate entity word in the prompt template to obtain a second span representation of the candidate entity word; and generating the vector representation of the candidate entity word according to the first span representation, the second span representation, and the vector representation of the text element of the mask word, wherein the generating of the vector representation of the candidate entity word further includes performing a second integration process on the first span representation and the second span representation to obtain a third span representation; and concatenating the third span representation and the vector representation of the text element of the mask word to obtain the vector representation of the candidate entity word, and wherein the original text span and the span in the prompt template are combined in the generating of the vector representation of the candidate entity word to obtain a final representation of the candidate entity word, and the final representation of the candidate entity word is provided to a neural network model.

* * * * *